United States Patent [19]

Strand

[11] Patent Number: 5,781,383
[45] Date of Patent: Jul. 14, 1998

[54] MAGNETIC HEAD FOR STABLE TIP TO TAPE CONTACT PRESSURE DESPITE HEAD WEAR AND TAPE TENSION VARIATION

[75] Inventor: Steinar J. Strand, Langhus, Norway

[73] Assignee: Tandberg Data Storage AS, Oslo, Norway

[21] Appl. No.: 136,997

[22] Filed: Oct. 18, 1993

Related U.S. Application Data

[63] Continuation of Ser. No. 817,234, Jan. 6, 1992, abandoned.

[51] Int. Cl.$^6$ ..................................................... G11B 5/187
[52] U.S. Cl. ............................................. 360/122; 360/129
[58] Field of Search ..................................... 360/122, 120, 360/125, 129

[56] References Cited

U.S. PATENT DOCUMENTS

| 3,526,885 | 9/1970 | Anderson et al. | 340/174.1 |
|---|---|---|---|
| 3,983,622 | 10/1976 | Schneider et al. | 29/603 |
| 4,589,043 | 5/1986 | Grundtner | 360/122 |
| 4,839,959 | 6/1989 | Mersing | 360/122 |
| 4,868,697 | 9/1989 | McClure | 360/122 |
| 4,875,129 | 10/1989 | Favrou et al. | 360/122 |
| 4,888,657 | 12/1989 | Lacey et al. | 360/122 |
| 4,949,208 | 8/1990 | Milo et al. | 360/122 |
| 5,012,572 | 5/1991 | Matsuzawa et al. | 360/122 |
| 5,031,064 | 7/1991 | Ashikawa et al. | 360/122 |
| 5,140,483 | 8/1992 | Koga et al. | 360/122 |

FOREIGN PATENT DOCUMENTS

| 0 439 943 A2 | 8/1991 | European Pat. Off. |
|---|---|---|
| 63-66706 | 3/1988 | Japan. |

OTHER PUBLICATIONS

Patent Abstracts of Japan, vol. 12, No. 290, Aug. 9, 1988, Yoshinori Izukura, "Magnetic Head".

Primary Examiner—Stuart S. Levy
Assistant Examiner—Kevin M. Watkins
Attorney, Agent, or Firm—Hill & Simpson

[57] ABSTRACT

An improved magnetic head is disclosed for stable pole tip to tape contact pressure despite head wear and tape tension variations. A magnetic head which contacts the magnetic tape comprises a ferromagnetic body. A recess is provided in this ferromagnetic body. A ferromagnetic core has pole tips which are located in the recess and which are arranged for contact with the magnetic tape. A non-magnetic material is arranged along each side of the magnetic core pole tips in the recess. Relative hardnesses of the ferromagnetic body, ferromagnetic core pole tips, and nonmagnetic material are chosen so that as the tape wears away on contact surfaces of the magnetic core pole tips, non-magnetic material, and ferromagnetic body, the core pole tips protrude relative to adjacent portions of the ferromagnetic body and the non-magnetic material so that the tape rides on the protruding pole tips of the core. A radius of curvature at the contact surface of the magnetic core pole tips prior to wearing of the pole tips is chosen such that it is smaller than a natural radius of bending of the tape.

15 Claims, 1 Drawing Sheet

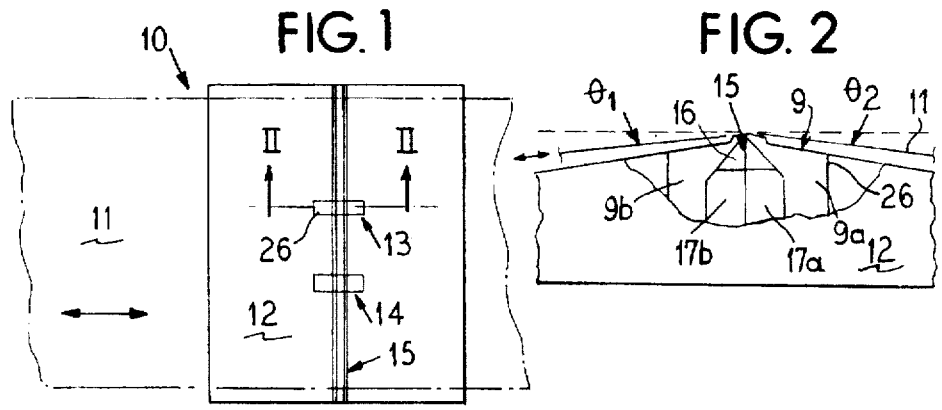
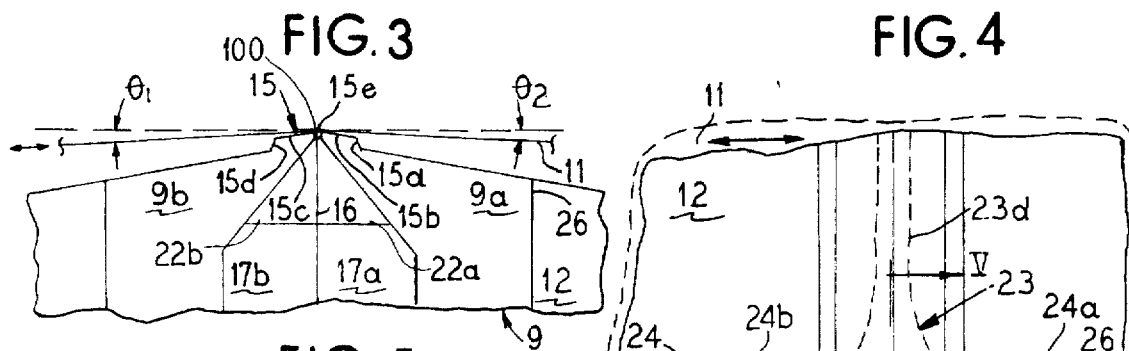
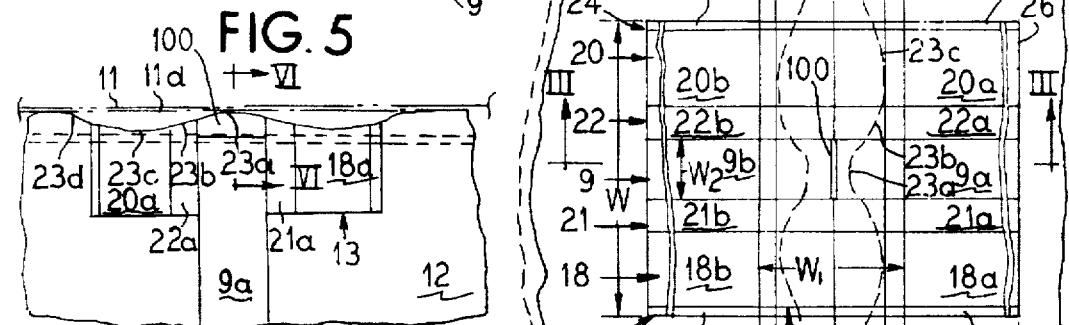
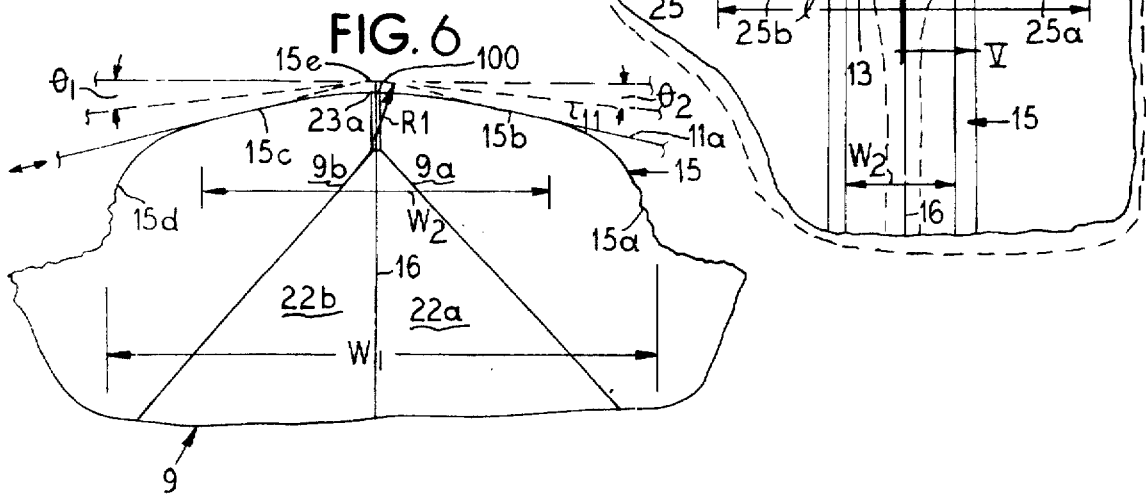

MAGNETIC HEAD FOR STABLE TIP TO TAPE CONTACT PRESSURE DESPITE HEAD WEAR AND TAPE TENSION VARIATION

This is a continuation of application Ser. No. 07/817,234, filed Jan. 6, 1992, now abandoned.

BACKGROUND OF THE INVENTION

The present invention relates to magnetic heads, and more particularly to magnetic heads employed for reading and/or writing at high densities on magnetic tape where the tape tension varies.

In prior art magnetic recording and reading systems, the problem arises of providing a stable magnetic head pole tip to tape contact pressure, particularly with data storage systems wherein high density reading and writing of data from and to the tapes occurs.

It has been known to provide data tapes completely enclosed in cartridges. Such cartridges have guides and hubs. In such cases, the tape tension is determined by roller bearing friction, by tape guide friction, and by other means within the cartridge.

It has been a problem in the prior art that with such cartridges, it is difficult to obtain stable pole tip to tape contact pressure, particularly in view of wear characteristics of the magnetic head being used to read or write from the tape.

When the tape tension in a drive system or in a cartridge system is controlled to be within specific values, such as by a servo loop or by other means, a design of a contour of the magnetic head is mainly based upon a natural radius of bending of the tape. By utilizing this principle, and the use of materials of proper wear resistance in the tape contact area, it is possible to maintain a stable and sufficient head to tape contact pressure throughout the lifetime of the head. Such a head is sometimes denoted as a head of constant area wear.

Often, in order to achieve even wear along the gap lines, materials in these areas are selected to have the same wear resistance. The materials of the cores and housing are often of the same type of ferrite, and other materials in the tape contact area are usually avoided. The areas of the necessary bonding materials, such as glass or epoxy, are kept to an absolute minimum.

However, both with the above described system and the previously described constant area wear system, there is the significant disadvantage that varying tape tension can result in unacceptable write and read performance in view of unstable or insufficient pole tip to tape contact pressure.

In many cartridge systems, and even in open loop systems, the tape tension may vary as much as by a ratio of 1:4 from cartridge to cartridge or from drive to drive. As the natural radius of bending of the tape is directly related to the tape tension, this radius is not constant. Different tape thicknesses and different tape materials also have an influence on the natural radius of bending of the tape. Therefore, this radius cannot directly be utilized in head design, such as when determining head contour and head materials.

Essential to all tape recording is to have a stable and a high enough contact pressure between the tape and the pole tips of the head core. This is particularly true in high frequency data processing wherein data is written or read at high densities. This condition must exist for all actual tapes and must be maintained throughout the operating lifetime of the head. The performance of the head shall be stable until the end of life is reached when the pole tips of the head are worn through.

It is of special importance to secure proper contact conditions for new heads or drives. This is due to the necessity of having a good correlation between measurements carried out by the head manufacturer, measurements by the user, and tests carried out after the head has been mounted in a drive and tested as part of a complete system. Tape cartridges used for such measurements are normally selected to have a tape tension within a limited range. However, it is still a necessity to select a head contour that provides stable performance within this somewhat limited tension range.

SUMMARY OF THE INVENTION

It is an object of the invention to provide a magnetic head which has both a long life despite wearing, and which provides stable and sufficient pole tip to tape contact pressure, despite a tape tension which may vary significantly from cartridge to cartridge or from drive to drive.

It is a further object of the invention to avoid the need of specifically designing core pole tips contour for a given tape natural bending radius.

According to the invention, a magnetic head is provided wherein pole tips of the magnetic head core are flanked at each side in a direction along a gap line of the magnetic head by relatively softer non-magnetic materials. The relatively harder ferrite material of the magnetic core does not wear as rapidly as the softer material non-magnetic regions at both sides of the core pole tips. Thus, as head wear increases, the pole tips protrude to a greater and greater extent above the softer material adjacent areas so as to maintain and even improve contact pressure, despite wear of the head. Furthermore, the tape head is designed to accommodate a wide range of tape tension variation, since the core pole tips are elevated and form a peak about which the tape bends over a curved surface having a relatively small radius of curvature.

Preferably, the core pole tips and the associated softer non-magnetic materials alongside the core pole tips are provided in a window or pocket of a ferrite body of the head. Preferably, the magnetic ferrite material of this ferrite body is softer than the core ferrite material of the core pole tips within the window. Consequently, such ferrite material outside the window wears faster than the harder ferrite core pole tip material within the window so that pole tip protrusion is further promoted by tape wear on the head.

The softer materials within the window which flank the magnetic core pole tips preferably comprise non-magnetic bonding regions such as glass, and further non-magnetic flanking regions, such as ceramic.

BRIEF DESCRIPTION OF THE DRAWINGS

FIG. 1 is a top view looking onto a tape running surface of the magnetic head according to the present invention;

FIG. 2 is a fragmentary side cross-sectional view taken alone line II—II of the magnetic head of FIG. 1 showing one of the core pole tip assemblies thereof;

FIG. 3 is an expanded more detailed view of the cross section shown in FIG. 2 as taken along line III—III of FIG. 4;

FIG. 4 is an expanded and detailed top view of the top tape running surface of one of the magnetic head core pole tip assemblies shown in the magnetic head of FIG. 1;

FIG. 5 is a fragmentary cross-sectional view taken along line V—V of FIG. 4 illustrating a cross section of the head core pole tip assembly with the tape running direction being perpendicular to the plane of the drawing; and FIG. 6 is an enlarged cross-sectional view taken along line VI—VI of FIG. 5 showing a contour of a tape head core pole tips at a rail of the head both before and after substantial wearing of a head surface of the core pole tips has occurred.

DESCRIPTION OF THE PREFERRED EMBODIMENTS

A magnetic head 10 employing principles according to the invention is shown in the top view of FIG. 1 illustrating the surface of the magnetic head assembly facing a tape 11 which may run in either direction across the head assembly. The head assembly is formed of a housing preferably formed as or including a magnetic ferrite body 12. The tape 11 is typically under tension along the tape running direction, as shown by double arrows in the drawing figures. In a tape cartridge, or even in some drive systems, this tape tension can vary by as much as 4:1.

Magnetic core pole tip assemblies such as 13 or 14 are each located at a respective pocket-like recess or window within a top surface of the ferromagnetic body 12. If two tracks are to be written or read on the tape 11, then two magnetic core assemblies such as 13 and 14 are provided. The invention, however, is applicable regardless of whether one or a plurality of magnetic core assemblies are provided. And these magnetic core pole tip assemblies 13 and 14 can be either read or write heads. Also, a plurality of gap lines such as 16 (see FIG. 3) can be provided in the magnetic head, with each gap line 16 having one or more core assemblies.

A rail 15 forming a protrusion is provided running transverse to the tape running direction. This rail 15 provides a tape contact surface having a curved peak 15e for the tape 11, as more clearly shown in FIGS. 2, 3, and 6.

As can be seen in FIG. 1, the magnetic head core pole tip assemblies 13 and 14 have a longitudinal extent along the tape running direction and run through and extend to both sides of the rail 15.

As shown in FIGS. 2 and 3, the tape 11 at the top of the rail 15 forms an angle $\theta_1$ or $\theta_2$ relative to a horizontal reference. Preferably the angles $\theta_1$ and $\theta_2$ are approximately 5° so that the total wrap angle is about 10°.

The magnetic head core pole tip assembly 13, as mentioned previously, is formed in a pocket-like rectangular recess or window 26 formed in the ferromagnetic body 12. The head is primarily formed of a ferromagnetic core 9 having pole tips 9a and 9b with a gap line 16 therebetween. A thin glass layer 100 is provided in the gap between the pole tips 9a and 9b. The ferromagnetic body 12 is also split at least at a top portion by gap line 16 into portions 17a and 17b. The major portion of the core 9 is not shown in the drawings. The upper pole tips 9a and 9b extend up into the window or recess 26 through an aperture in the floor of the recess 26.

As illustrated in FIGS. 3 and 6, the rail 15 has steeply sloped leading portions 15a and 15d and relatively slightly sloped top portions 15b and 15c meeting at a rounded or curved peak 15e more clearly shown in FIG. 6.

The concepts of the present invention are most readily apparent from FIGS. 4, 5, and 6. As shown in FIG. 4, the magnetic head core pole tip assembly such as 13 located in the window or recess 26 is formed of ferromagnetic core 9 having pole tips or core portions 9a and 9b having the gap 16 therebetween, along with the glass layer 100 in the gap 16. This ferromagnetic core 9 is flanked only in a direction transverse to the tape running direction at one side by the bonding glass region 22 having portions 22a, 22b, and at the other side by another bonding glass region 21 having portions 21a, 21b. The gap line 16 separates the region portion 22a from 22b and region portion 21a from 21b. These bonding glass regions are formed of a non-magnetic material which glue or bond to the non-magnetic material flanking regions 20 and 18 which are positioned only outwardly of the bonding glass regions 21 and 22. These regions 20 and 18 thus form additional non-magnetic material regions. Thereafter, further non-magnetic outer bonding layers 24 and 25 are provided between outer side walls of the window or recess 26 and the flanking regions 20 and 18. These bonding layers are also divided by the gap 16 into respective portions 24a, 24b and 25a, 25b. Preferably, the non-magnetic flanking regions 20 and 18 are ceramic, and these ceramic material regions are held in position by the outer bonding material layers 24, 25 and the bonding glass regions 22 and 21.

The central core 9 is formed of a ferromagnetic material which is harder than any of the non-magnetic regions and layers lying within the window 26 as previously described. Furthermore, the bonding glass regions 22 and 21 are of a softer material than the ceramic non-magnetic flanking regions 20 and 18. Finally, the ferromagnetic material of the ferromagnetic outer body 12 is softer than the ferromagnetic core 13.

FIG. 5 also shows in cross section the various materials of the head as previously described. Furthermore, both FIGS. 4 and 5 show the result of head wear after approximately 1000 to 2000 hours use. As can be seen in FIG. 6, prior to wear occurring, the tape 11 lies along a curved peak at 15e of the core 9 and its pole tips 9a, 9b shown in dashed lines. After 1000 or 2000 hours of wear, a lower curved profile 23a develops on the core 9 as shown in FIGS. 5 and 6, and at 23 as shown by dashed lines in FIG. 4 for all of the materials. This profile 23 has at the core 9 less wear as illustrated by the curve portion 23a in FIGS. 4, 5, and 6. The tape thus rides lower as shown at 11a in FIGS. 5 and 6. In the non-magnetic material flanking and bonding regions which are softer, greater wear occurs as indicated at 23c and 23b, respectively in FIG. 4. Outwardly of the pocket or window 26, the softer ferromagnetic material of body 12 also has wearing as indicated at 23d in FIG. 4, but to a lesser extent than the nonmagnetic regions and layers described. The overall result is that the central core 9 at the pole tips 9a and 9b remains higher than directly adjacent regions. Thus, as shown in FIGS. 5 and 6, the tape is positioned at 11a at the worn peak 23a formed by the core pole tips 9a, 9b. Thus, despite wear, the pole tip to tape contact pressure is still maximized.

As shown in FIG. 6, the core, rail, and non-magnetic region contour is made with a relatively small radius R1 of curvature at the gap line 16 and as shown at 15e prior to wear occurring. This radius is smaller than the natural bending radius of the tape with minimum tension applied. This achieves a small contact area and thus a maximized contact pressure, even when low tension tapes are used. As shown in FIG. 6, the transition between the high point at 15e and the relatively flat areas 15b and 15c on both sides of the gap line 16 is extremely smooth. The relatively flat polished areas 15b and 15c outside the curved gap area at the peak 15e are arranged as tangents to the curved gap area at 15e.

As the head is being used, the wear and polishing effect of the running tape shapes the head front. After 1500 to 2500 hours, the complete area as shown by the width line $W_2$ in FIGS. 4 and 6 has become in contact with the tape 11a as shown. Thus, a stable contour/profile is reached. The contour of this area shown by the width $W_2$ is now semicircular, with a radius representing the natural radius of bending of a mean value of the tape. The aerodynamic effect of a fast running tape is also reflected in the shape of the head surface, so that an ideal contour/profile is achieved.

The tape contact area thus increases several hundred percent during this run-in. By a proper selection of materials and the relative distribution of the aforementioned different materials along the gap line 16 as most vividly shown in FIGS. 4 and 5, the necessary contact pressure between the tape and the pole pieces of the cores is maintained during the run-in period as well as during the complete operating lifetime.

The wear characteristics of the materials as previously described and their relative distribution along the gap line 16 is selected so that a protruding core 9, and more specifically the pole tips 9a, b, results based on the run-in and wear processing, as shown at 23a in FIG. 5.

As previously described, non-magnetic materials with a rather low wear resistance surround the head core pole tips 9a, 9b. The outside ferromagnetic body 12 is comprised of a relatively hard magnetic ferrite, while the core 9 is made of the most wear resistant ferrite available. The wear resistance of the core 9 may be increased further by additives of a small percentage of extremely hard particles. As previously described, the different materials are bonded together by glass, epoxy, or other adhesives or combinations of these. The bonding glass regions 21 and 22 also serve as a low wear resistant material surrounding the core 9 alone or in combination with other non-magnetic materials of proper, relatively low wear resistance.

The width $W_2$ of the rail along the slightly sloped surfaces 15b and 15c (which is less than the overall rail width $W_1$) as previously described with respect to FIG. 6 is also an important part of the head running surface contour. It must be rather narrow, but its minimum width will in some cases be determined by the manufacturing process used. The basic idea is that this area width $W_2$ must be narrow when materials of nearly similar wear resistance are used along the gap line 16. Only when the core material is of a very high wear resistance compared to the surroundings, are wider landing areas permitted.

In a preferred embodiment of the invention, the radius $R_1$ prior to wear is substantially less than half of the rail width at $W_2$.

The overall width $W_2$ of the rail is approximately ten times less than the overall length 1 of the core pole tip assembly 13. Furthermore, the width W of the core pole tip assembly 13 (the window dimension) as shown in FIG. 4 and in a longitudinal direction of the rail 15 is approximately one-half of the length 1 of the magnetic core 9 in the tape running direction (since FIG. 4 is a fragmented view in the "1" direction, this relationship is not shown to scale in FIG. 4).

Although various minor changes and modifications might be proposed by those skilled in the art, it will be understood that I wish to include within the claims of the patent warranted hereon all such changes and modifications as reasonably come within my contribution to the art.

I claim as my invention:

1. A magnetic head for contact with a magnetic tape, comprising:
   a ferromagnetic body having a protruding rail defined by sides and having a top surface defining a maximum tape contacting surface area between the sides;
   a recess in the ferromagnetic body extending beyond said sides in a tape running direction;
   a ferromagnetic core having pole tips in the recess and arranged for contact with the magnetic tape at said top surface of the rail, said pole tips extending at said top surface in a tape running direction beyond both sides of the rail and up to sidewalls of said recess which are perpendicular to said tape running direction;
   a non-magnetic material only along each side of the magnetic core pole tips in the recess said non-magnetic material extending parallel to the running direction of the tape, no non-magnetic material being provided between ends of the pole tips and said side-walls of said recess which are perpendicular to the tape running direction;
   relative hardnesses of the ferromagnetic body, ferromagnetic core pole tips, and non-magnetic material being chosen such that as the tape wears away on contact surfaces of the magnetic core pole tips, non-magnetic material, and ferromagnetic body, the core pole tips protrude relative to adjacent portions of the ferromagnetic body and the non-magnetic material so that the tape rides on the protruding core pole tips; and
   a radius of curvature in a running direction of the tape at the tape contact surface of the core pole tips prior to wearing being smaller than a natural radius of bending of the tape, and said relative hardnesses being selected such that after approximately 1500 hours of tape wear, said radius of curvature substantially becomes said natural radius of bending of the tape.

2. A magnetic head according to claim 1 wherein said core pole tips prior to wear have a profile comprising a peak portion defining said radius of curvature and which is flanked by relatively slightly sloped portions which blend into steep flank portions in the tape running direction, and half of a width between said flank portions being substantially greater than said radius of curvature of said peak portion.

3. A magnetic head according to claim 1 wherein said maximum contact area after wear of the magnetic core pole tips by the tape is determined by a difference in wear resistance of the core pole tips compared to the non-magnetic adjacent materials.

4. A magnetic head according to claim 1 wherein said non-magnetic material at each side of said core pole tips comprises a non-magnetic material bonding region and outwardly thereof a non-magnetic material flanking region.

5. A magnetic head according to claim 4 wherein the non-magnetic material bonding region comprises a bonding glass and the non-magnetic material flanking region comprises ceramic.

6. A magnetic head according to claim 4 wherein the ferromagnetic core pole tips are harder than the bonding and flanking regions.

7. A magnetic head according to claim 1 wherein the ferromagnetic core pole tips are harder than the ferromagnetic body.

8. A magnetic head according to claim 1 wherein said rail is provided at a tape facing surface of the ferromagnetic body and running in a direction perpendicular to a desired tape running direction across the head.

9. A magnetic head according to claim 8 wherein said recess in said ferromagnetic body is rectangular and has a longitudinal extent along the tape running direction and is positioned at said rail and extends longitudinally to both sides of said rail and said ferromagnetic body.

10. A magnetic head according to claim 8 wherein said rail is shaped such that when said tape rides on a peak thereof there is approximately a 5° angle formed by the tape relative to a horizontal plane.

11. A magnetic head according to claim 1 wherein the non-magnetic material in the recess comprises the following sequence of materials at each side of the magnetic core pole tips—an outer bonding layer at a side wall of the recess, an outer flanking region, and a bonding region between the flanking region and the core pole tips.

12. A magnetic head for contacting magnetic tape, comprising:

a ferromagnetic body having a protruding rail defined by sides and having a top surface defining a maximum tape contacting surface area between the sides;

a ferromagnetic core in a recess in said ferromagnetic body and having pole tips forming a tape contact surface, said pole tips extending at said top surface in a tape running direction beyond both sides of said rail up to and in abutting contact with sidewalls of said recess which are perpendicular to a tape running direction; and material means adjacent to the ferromagnetic core pole tips in said recess for causing the tape contact surface of the magnetic core pole tips to protrude relative to a tape contact surface of the adjacent material means as a result of tape wear, said material means comprising a non-magnetic bonding region directly adjacent and only at both opposite sides of the pole tips, said non-magnetic bonding regions being parallel to the tape running direction, and a non-magnetic material flanking region directly adjacent each of the bonding regions, the pole tips comprising a material having a greater wear resistance than the bonding and flanking regions and the flanking region wear resistance being greater than the wear resistance of the bonding region.

13. A magnetic head according to claim 12 wherein the bonding regions comprise glass and the flanking regions comprise ceramic.

14. A magnetic head, comprising:

a ferromagnetic body;

a rail at a tape facing surface of the ferromagnetic body and running in a direction perpendicular to a desired tape running direction across the head, said rail having a top surface defining a maximum tape contacting surface area between sides thereof;

a rectangular recess having a longitudinal extent along the tape running direction and being positioned at said rail and extending longitudinally beyond both sides of said rail in said ferromagnetic body;

a ferromagnetic core having pole tips extending into said recess and extending at said top surface in said tape running direction beyond both sides of said rail to abutting contact with sidewalls of said recess perpendicular to said tape running direction, and respective non-magnetic material flanking regions only between said core pole tips and respective outer side walls of said recess at sides of said core pole tips said flanking regions being parallel to said tape running direction and not between ends of said pole tips and said recess sidewalls perpendicular to said tape running direction;

a bonding region of non-magnetic material between each of said flanking regions and core pole tips;

said ferromagnetic core having a greater tape wear resistance than a tape wear resistance of said bonding and flanking region non-magnetic material whereby as the tape wears down a running surface of the head, the core pole tips protrude to a greater and greater extent relative to the non-magnetic material flanking and bonding regions adjacent thereto; and said bonding region wear resistance being smaller than said flanking region wear resistance, and a wear resistance of said ferromagnetic body being less than the wear resistance of said pole tips.

15. A magnetic head for contact with a magnetic tape, comprising:

a ferromagnetic body having a protruding rail defined by sides and having a top surface defining a maximum tape contact surface and between the sides;

a recess in the ferromagnetic body extending beyond said sides of said protruding rail;

a ferromagnetic core having pole tips in the recess and arranged for contact with the magnetic tape at said top surface of the rail, said pole tips extending at said top surface in a tape running direction beyond both sides of the rail into abutting contact with the sidewalls of the recess perpendicular to said tape running direction;

a non-magnetic material alongside only each side of the magnetic core pole tips and the recess, said non-magnetic material running parallel to said tape running direction and not between said pole tips and said recess sidewalls perpendicular to the tape running direction;

a relative hardness of the ferromagnetic core pole tips being greater than respective relative hardnesses of said ferromagnetic body and non-magnetic material such that as the tape wears away on contact surfaces of the magnetic core pole tips, nonmagnetic material, and ferromagnetic body, the core pole tips protrude relative to adjacent portions of the ferromagnetic body and the non-magnetic material so that the tape rides on the protruding core pole tips; and said relative hardness of the pole tips being chosen such that a radius of curvature in a running direction of the tape at the tape contact surface of the core pole tips prior to wearing is initially smaller than a natural radius of bending of the tape, but later substantially becomes said natural radius of bending after substantial wearing has occurred.

* * * * *